(12) United States Patent
Coan

(10) Patent No.: US 12,492,722 B2
(45) Date of Patent: Dec. 9, 2025

(54) ADAPTIVE HARDWARE SYSTEM AND METHOD OF USE

(71) Applicant: Textron Aviation Inc., Wichita, KS (US)

(72) Inventor: Michael Scott Coan, Clearwater, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/602,892

(22) Filed: Mar. 12, 2024

(65) Prior Publication Data

US 2025/0290535 A1 Sep. 18, 2025

(51) Int. Cl.
| | | |
|---|---|---|
| *F16B 37/04* | (2006.01) | |
| *B23P 11/00* | (2006.01) | |
| *B23P 15/00* | (2006.01) | |
| *B64C 1/06* | (2006.01) | |

(52) U.S. Cl.
CPC ............ *F16B 37/047* (2013.01); *B23P 11/00* (2013.01); *B23P 15/00* (2013.01); *B64C 1/06* (2013.01)

(58) Field of Classification Search
CPC ....... F16B 37/046; F16B 37/045; F16B 21/02
See application file for complete search history.

(56) References Cited

U.S. PATENT DOCUMENTS

| | | | | |
|---|---|---|---|---|
| 5,118,233 A | * | 6/1992 | Mitchell | F16B 37/045 |
| | | | | 411/85 |
| 5,655,865 A | * | 8/1997 | Plank | F16B 37/045 |
| | | | | 403/258 |
| 6,367,756 B1 | | 4/2002 | Wang | |
| 2005/0055809 A1 | | 3/2005 | Herb | |
| 2021/0309343 A1 | | 10/2021 | Joest | |

FOREIGN PATENT DOCUMENTS

| | | | | |
|---|---|---|---|---|
| EP | 2520877 A2 | * | 11/2012 | ............. F16B 7/187 |
| WO | WO-2018153931 A1 | * | 8/2018 | ............ F16B 37/042 |

OTHER PUBLICATIONS

English Machine Translation of WO-2018153931-A1 (Year: 2018).*
English Machine Translation of EP-2520877-A2 (Year: 2012).*

* cited by examiner

*Primary Examiner* — Sarang Afzali
(74) *Attorney, Agent, or Firm* — Avek IP, LLC

(57) ABSTRACT

A system and method for an adaptive hardware system. The adaptive hardware includes rail segments and reconfigurable anchor assemblies. The anchor assemblies are secured onto different portions of the rail segments at anchor installation ports. The anchor assemblies are adaptable for accepting common fastening elements (e.g., bolts), such that interior monuments and fixtures may be accommodated without interior aircraft design changes.

16 Claims, 14 Drawing Sheets

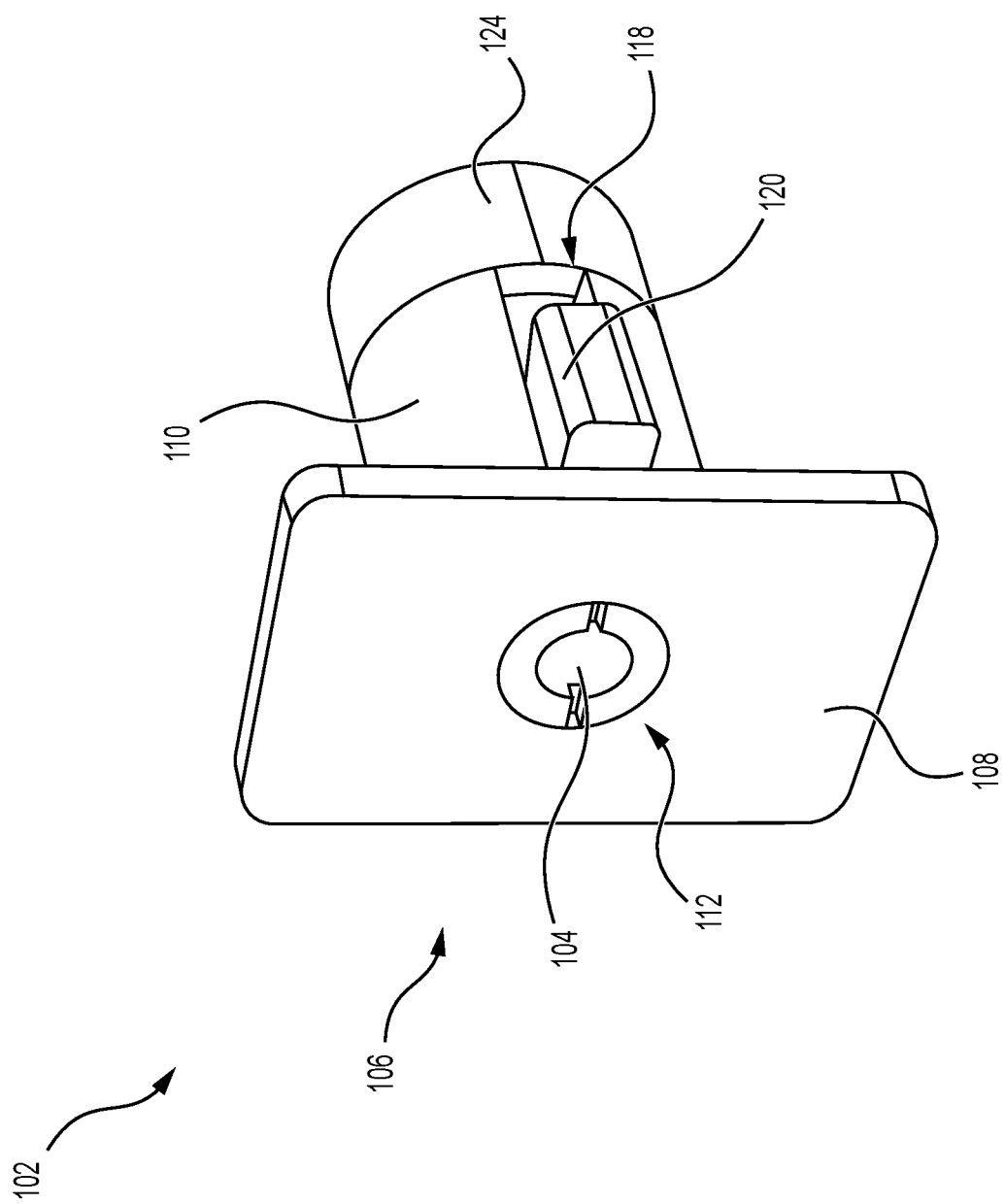

ADAPTIVE HARDWARE SYSTEM AND METHOD OF USE

BACKGROUND OF THE INVENTION

1. Field

The disclosed embodiments relate generally to the field of hardware installations. More specifically, the disclosed embodiments relate to the field of adaptable hardware to install fixtures.

2. Description of the Related Art

It is known to attach a fixture to a monument on an aircraft passenger cabin. For example, U.S. Patent Application Publication No. 2021/0309343 to Joest discloses a fastening system configured to attach a fixture to a monument installed in a passenger cabin.

It is also known to have a fastening element configured for a C-shaped mounting rail. For example, U.S. Patent Application Publication No. 2005/0055809 to Herb discloses a fastening element able to be arranged onto a C-shaped mounting rail.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments, the techniques described herein relate to an adaptive hardware system including: a rail wherein the rail includes at least one anchor installation port; and an anchor assembly configured to slide into the anchor installation port for securing to the rail, wherein the anchor assembly includes: a threaded barrel configured to receive a fastening element; and a spring disposed within the anchor assembly to bias the threaded barrel against the rail.

In some embodiments, the techniques described herein relate to an adaptive hardware system, the adaptive hardware system including: an anchor plate including a plate portion and a cylinder portion extending from the plate portion; a threaded barrel configured to slide into the anchor plate; a spring configured to slide into the anchor plate and bias the threaded barrel against the plate portion; and an end cap configured to slide over the cylinder portion of the anchor plate to form an anchor assembly.

In some embodiments, the techniques described herein relate to a adaptive hardware installation method including: forming an anchor assembly wherein the anchor assembly includes a threaded barrel, an anchor plate, and a spring; sliding the spring into the threaded barrel; inserting the threaded barrel into the anchor plate; providing a rail wherein the rail includes at least one anchor installation port formed into the rail; inserting the anchor assembly into the anchor installation port of the rail; and rotating the threaded barrel such that force from the spring biases a portion of the threaded barrel against the rail.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 1A is a perspective view of a reconfigurable anchor assembly, in an embodiment;

Figure 1B:
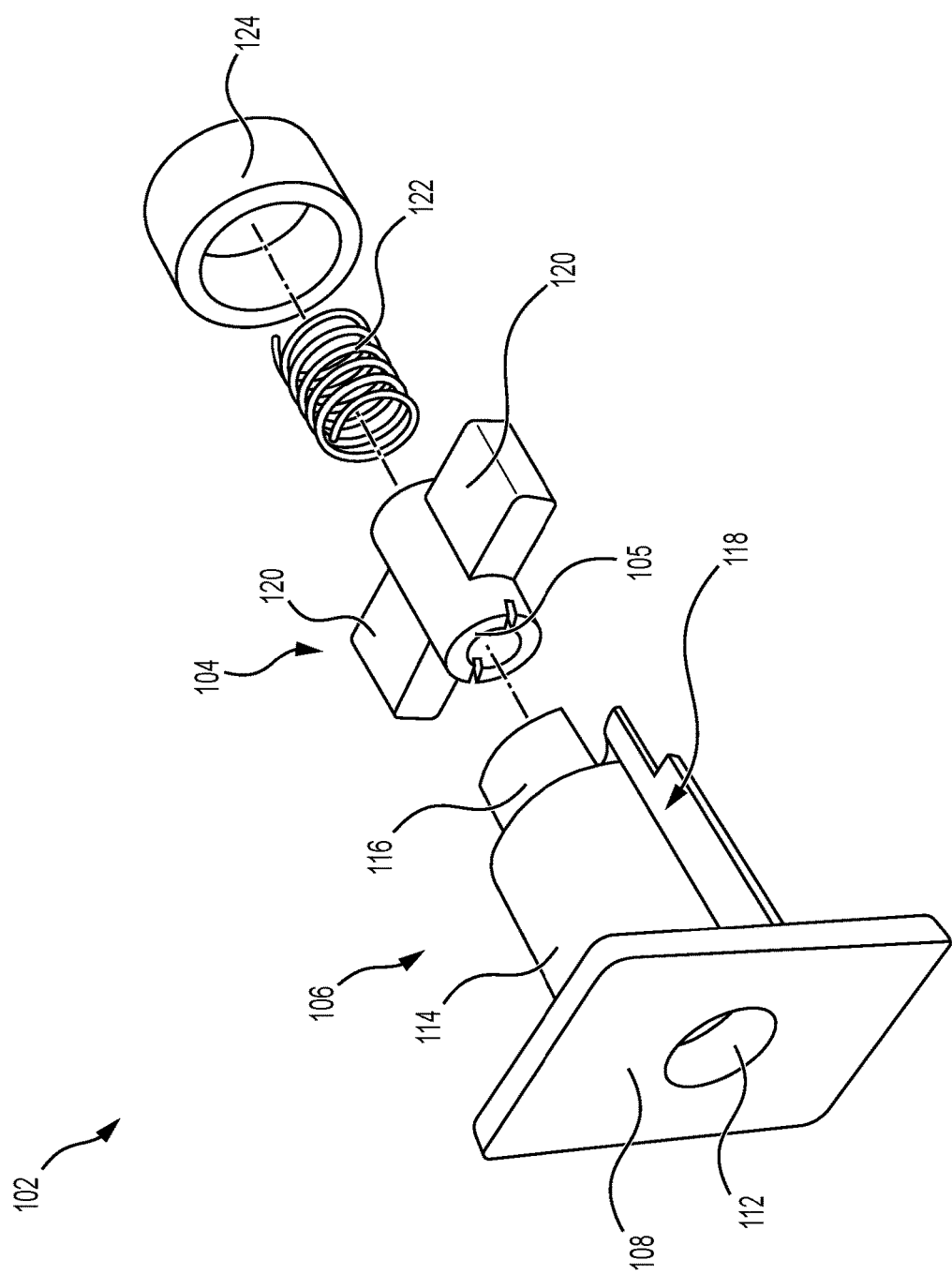
FIG. 1B is an exploded view of the reconfigurable anchor assembly of FIG. 1A.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In existing arrangements, fixtures installed in an aircraft interior may be installed to bracketry which is located and mounted using coordinated pilot holes or other tools. Different types of hardware, such as bolts, screws, clips, or fasteners may be used to install fixtures onto the bracketry. Oftentimes, a design change requiring different fixtures, hardware, and bracketry will be made after design considerations (such as pilot holes, tooling, and other permanent changes to an aircraft interior) were made for an original design. The design changes may lead to hardware changes that affect tooling, manufacturing, engineering, and other aircraft operations, and may contribute to airframe stress.

Embodiments disclosed herein provide an adaptive hardware system having rail segments and reconfigurable anchor assemblies. The anchor assemblies are able to be secured onto different portions of the rail segments via anchor installation ports located within the rail segments. The anchor assemblies are adaptable for accepting common fastening elements (e.g., bolts), such that interior monuments and fixtures may be accommodated without interior aircraft design changes. Advantageously, predetermined fixture locations and previously installed rails do not need to be altered to accommodate aircraft interior design changes.

Figure 3A:
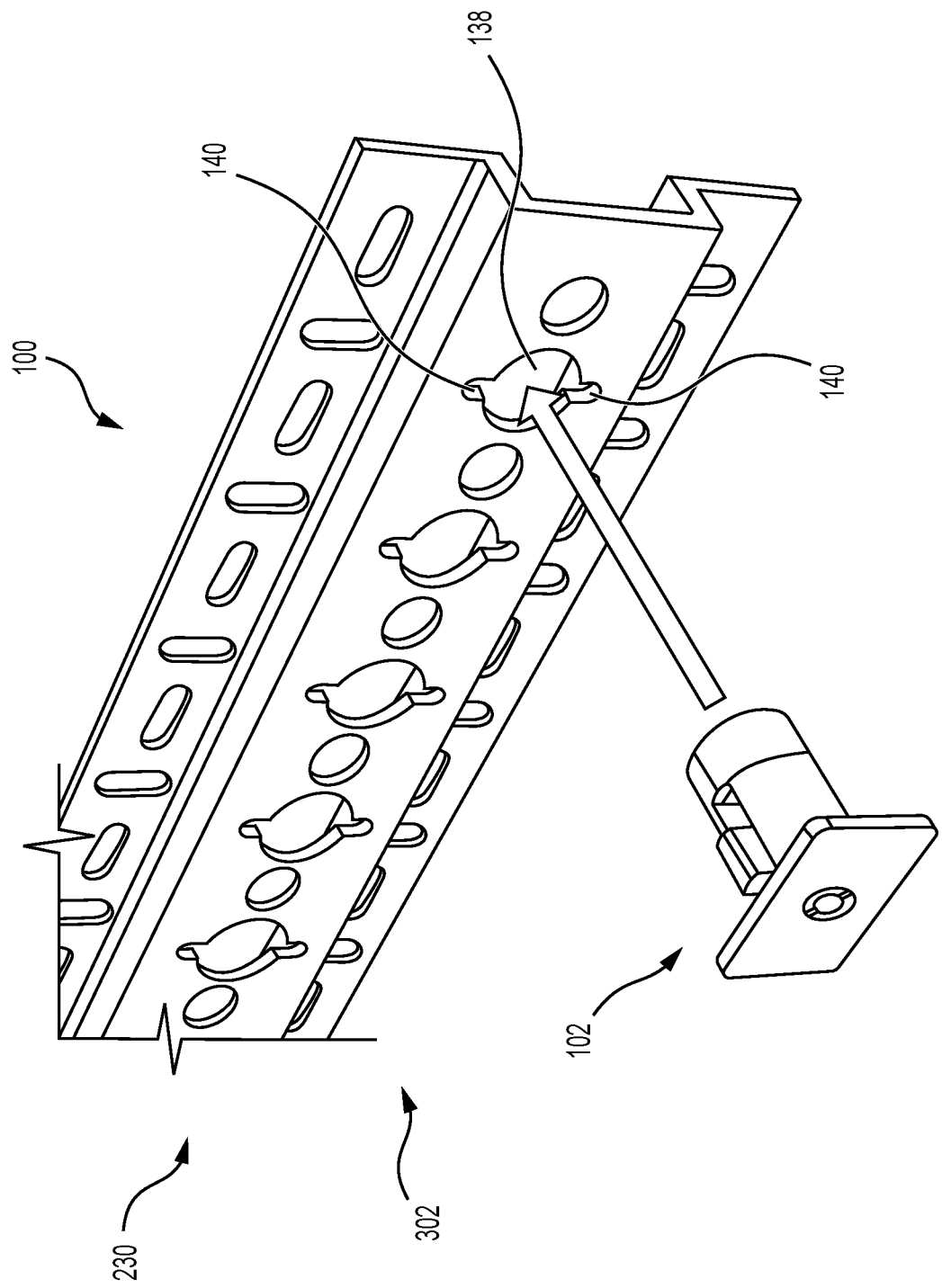
FIG. 3A is a perspective view of an adaptive hardware system comprising the reconfigurable anchor assembly of FIG. 1A and an anchor installation port of the rail of FIG. 2B.
Figure 3B:
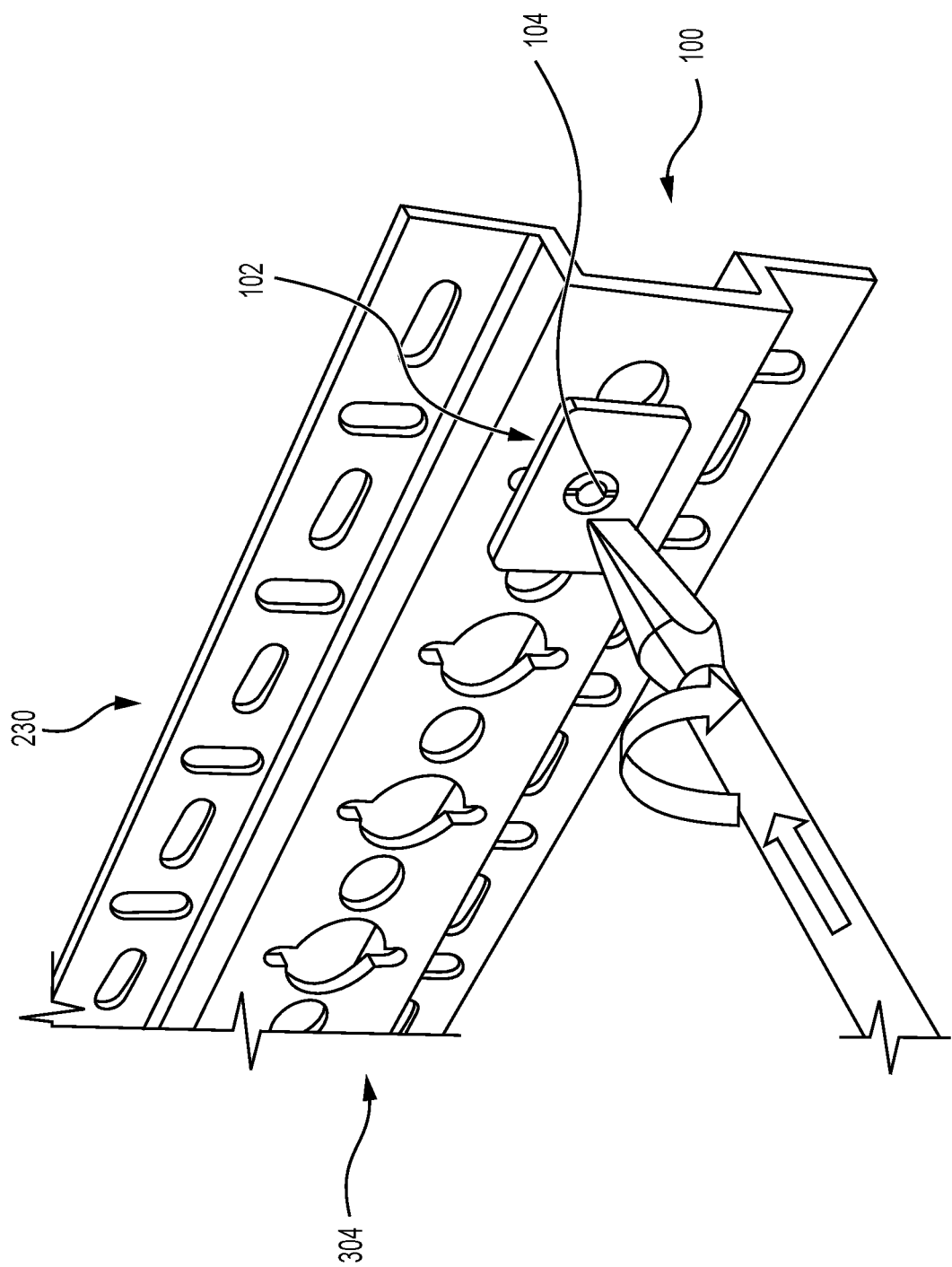
FIG. 3B is a front perspective view of the adaptive hardware system of FIG. 3A with the reconfigurable anchor assembly of FIG. 1A inserted into the anchor installation port of the rail of FIG. 2B.

FIGS. 1A and 1B are best viewed together and show a perspective view of an assembled (FIG. 1A) and exploded (FIG. 1B) reconfigurable anchor assembly 102 of the adaptive hardware system 100 (FIG. 3B). The anchor assembly 102 includes an anchor plate 106 and a barrel insert 105. The barrel insert 105 is configured for insertion into a centered hole 112 of the anchor plate 106. The anchor plate 106 includes a plate portion 108 and a cylinder portion 110. The plate portion 108 in embodiments is rectangular and coupled to an end of the cylinder portion 110. The centered hole 112 extends through the plate portion 108 and the cylinder portion 110. In embodiments, anchor plate 106 is formed from a single piece of material (e.g., machined or grown via 3D printing).

As best viewed in FIG. 1B, the cylinder portion 110 includes a first wide section 114 and a second section 116, with the second section 116 having a narrower diameter than the first section 114, and the narrow second section 116 extending outward from the first section 114. Both the first section 114 and the second section 116 include slots 118 aligned on opposing sides of the cylinder portion 110. The barrel insert 105 comprises wing portions 120 that extend outwardly on opposing sides and are configured for sliding within the slots 118 of the cylinder portion 110 of the anchor plate 106. The barrel insert 105 also comprises a threaded barrel 104. The slots 118 allow the wing portions 120 of barrel insert 105 to slide into the anchor plate 106 such that the threaded barrel 104 aligns with the centered hole 112.

When the reconfigurable anchor assembly 102 is assembled, the wing portions 120 of the barrel insert 105 protrude from the slots 118 of the cylinder portion 110 of the anchor plate 106. A spring 122 and an end cap 124 are configured to slide into the cylinder portion 110 behind the threaded barrel 104. The end cap 124 is sized and shaped to slide over the second section 116 of the cylinder portion 110 and abut the first section 114. The end cap 124 is configured to secure the threaded barrel 104 and spring 122 within the cylinder portion 110.

Figure 2A:
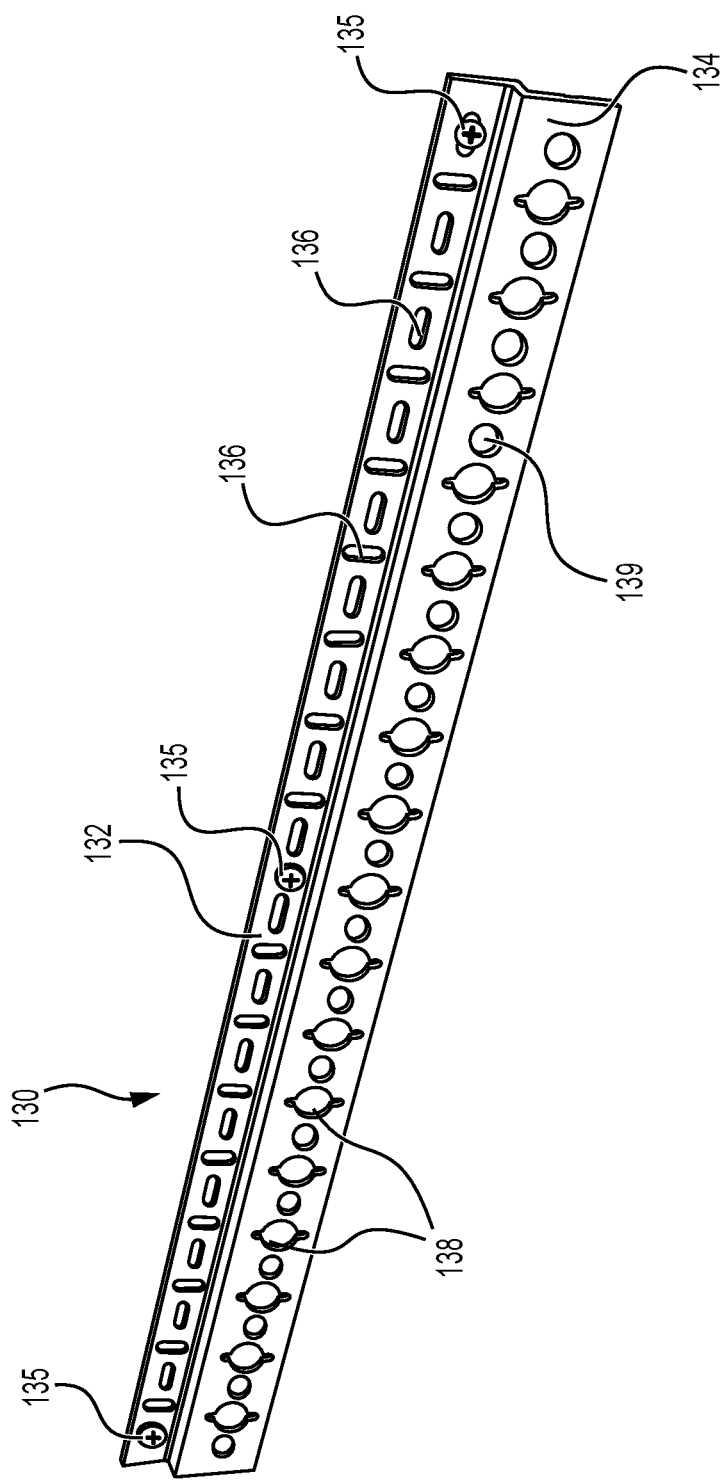
FIG. 2A is a perspective view of a rail for use with the reconfigurable anchor assembly of FIG. 1A, in an embodiment.

FIG. 2A shows a perspective view of an embodiment of a rail 130 of the adaptive hardware system 100. In embodiments, the rail 130 includes a first portion 132 and a second portion 134 which is offset from the first portion 132. The first portion 132 includes mounting provisions 136 which allow for the rail 130 to be mounted and secured to aircraft structure (e.g., frames, girders, stringers, struts, etc.) with fasteners, such as one or more bolts 135. The mounting provisions 136 in embodiments are slotted apertures which increase the tolerance in which the rail 130 may be aligned and mounted to existing aircraft structure. Some of the mounting provisions 136 are aligned vertically and others horizontally to provide the rail 130 freedom to be aligned with pre-drilled holes or other structural installation features. The second portion 134 includes anchor installation ports 138 which, in embodiments, may be spaced approximately an inch apart throughout the length of the rail 130. In some embodiments, lightening holes 139 may be formed in between each anchor installation port 138 to lighten the weight of rail 130. The anchor installation ports 138 are configured and shaped to allow the reconfigurable anchor assembly 102 to insert and become secured in the rail 130. An offset between the first portion 132 and second portion 134 allows for the first portion 132 to be substantially flush with aircraft structure while the second portion 134 is offset a distance from the aircraft structure.

Figure 2B:
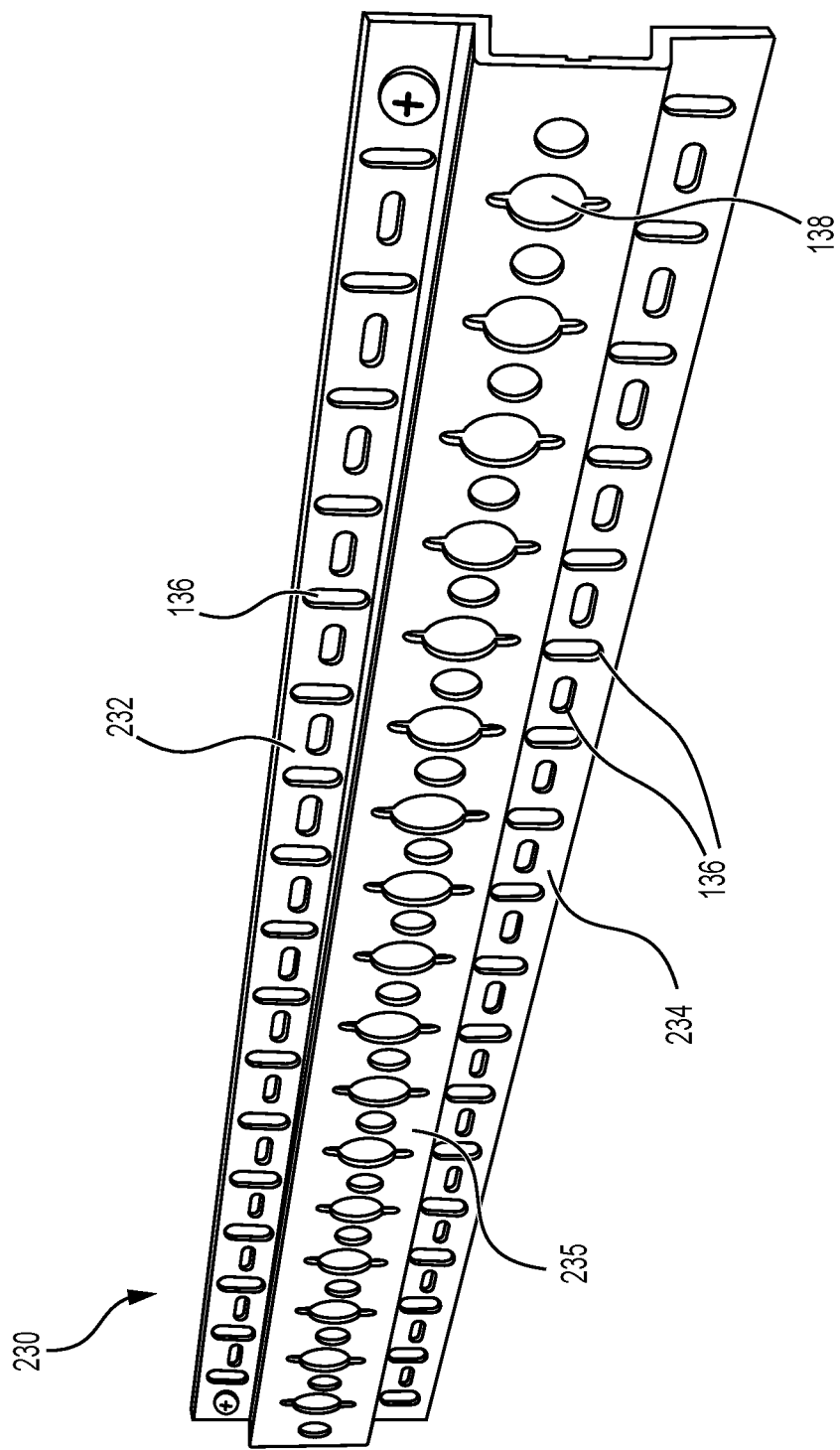
FIG. 2B is a perspective view of another embodiment of a rail for use with the reconfigurable anchor assembly of FIG. 1A.

FIG. 2B shows a rail 230, which is an alternative embodiment to that of the rail 130. The rail 230 includes an upper portion 232 and lower portion 234 each configured with the horizontal and vertical mounting provisions 136. A middle portion 235 is offset and in between the upper portion 232 and lower portion 234 such that the middle portion 235 is spaced a distance away from aircraft structure, while the upper portion 232 and lower portion 234 are substantially flush with the aircraft structure. The middle portion 235 includes the anchor installation ports 138.

Figure 2C:
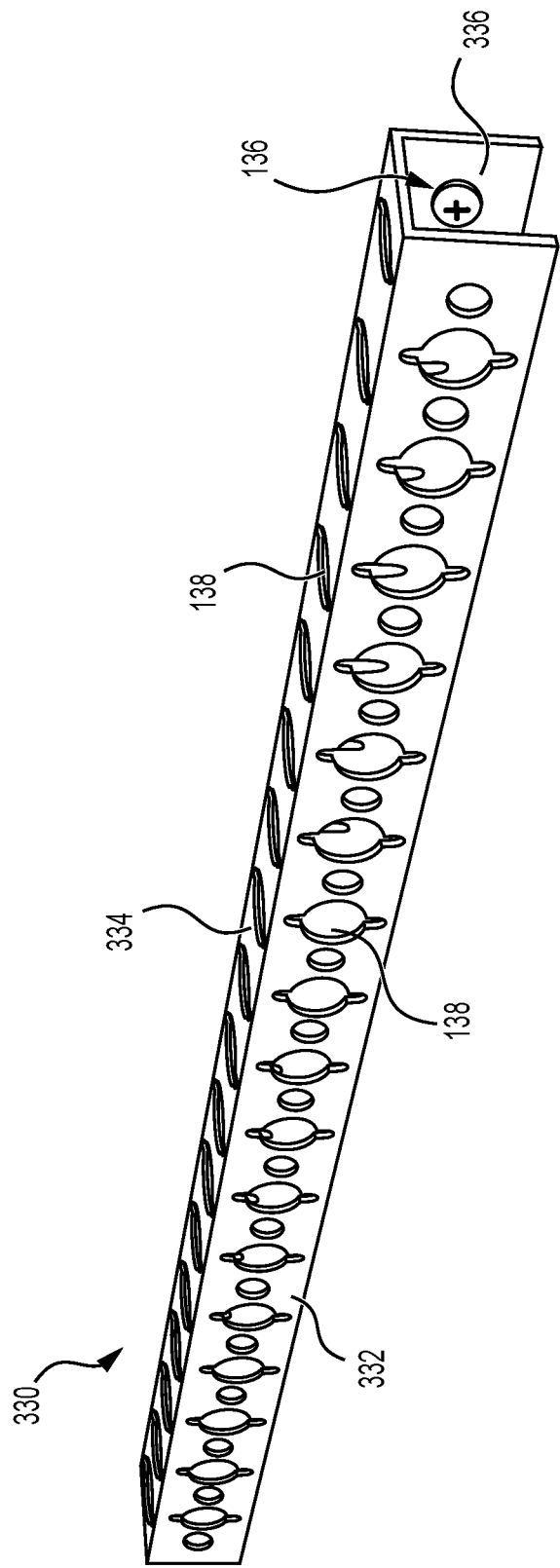
FIG. 2C is a perspective view of yet another embodiment of a rail for use with the reconfigurable anchor assembly of FIG. 1A.

FIG. 2C shows a rail 330, which is an alternative embodiment to that of the rail 130. The rail 330 is "C" shaped with a first side 332 including the anchor installation ports 138, a second side 334, and a third side 336. The second side 334 and the third side 336 may include anchor installation ports 138 or mounting provisions 136, or both.

Figure 3C:
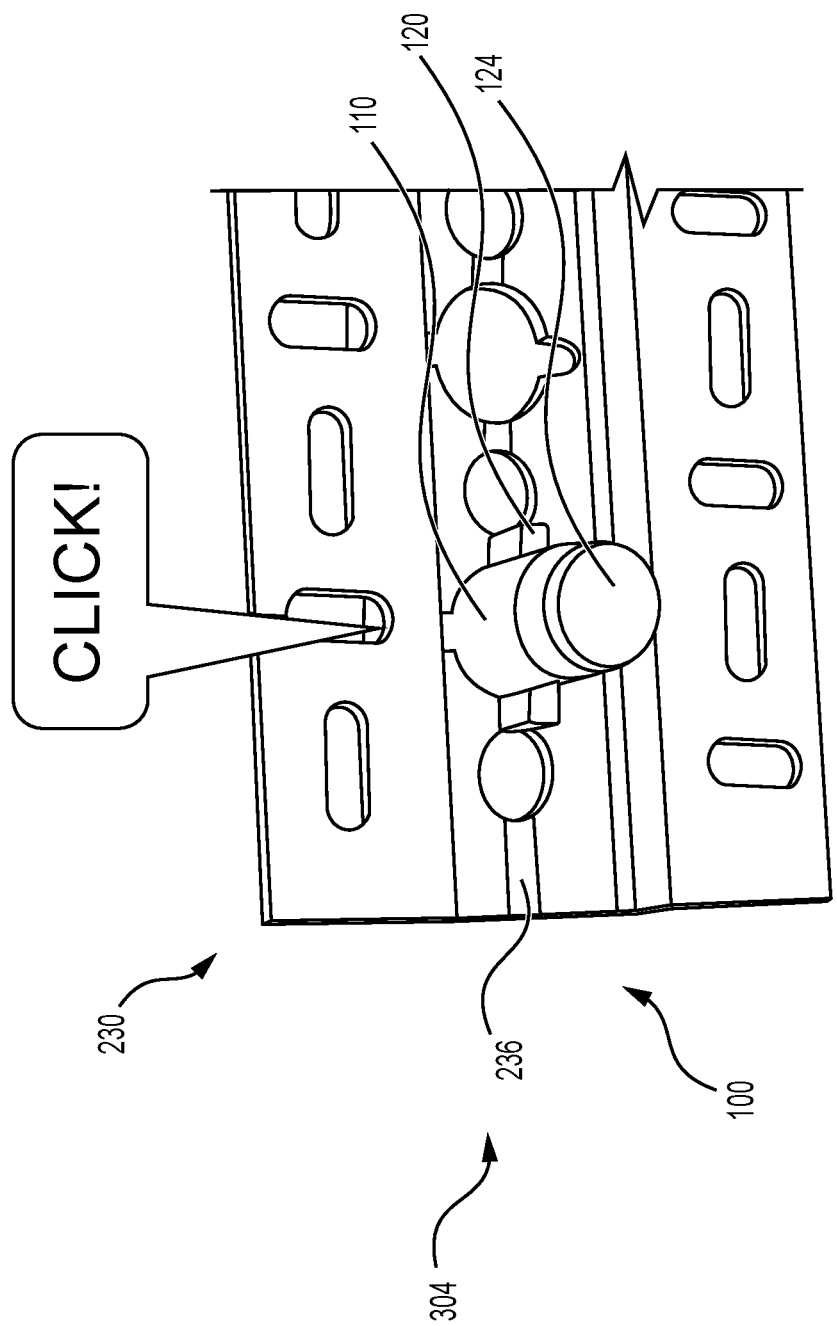
FIG. 3C is a rear perspective view of the adaptive hardware system of FIG. 3A with the reconfigurable anchor assembly of FIG. 1A installed into the anchor installation port of the rail of FIG. 2B.

FIG. 3A, FIG. 3B, and FIG. 3C are perspective views of the adaptive hardware system 100 and show a method for inserting the reconfigurable anchor assembly 102 into the rail 230. It should be known that the rail 130, or the rail 330 may be used in lieu of the rail 230.

In a step 302, shown in FIG. 3A, the reconfigurable anchor assembly 102 is aligned with an anchor installation port 138 on the rail 230. The anchor installation port 138 is a circular hole in embodiments, and includes notches 140 formed on opposite sides of the circle. The anchor installation ports 138 are sized such that the end cap 124 and cylinder portion 110 of the anchor plate 106 may slide through the hole. The reconfigurable anchor assembly 102 is aligned with the hole of the anchor installation port 138 such that the wing portions 120 of the threaded barrel 104 are aligned with notches 140 and the reconfigurable anchor assembly 102 is able to slide through the anchor installation port 138.

In a step 304, shown in FIG. 3B and FIG. 3C, the reconfigurable anchor assembly 102 is slid through the anchor installation ports 138. FIG. 3B shows a front perspective view of the inserted reconfigurable anchor assembly 102 while FIG. 3C shows a rear perspective view of the inserted reconfigurable anchor assembly 102. When inserted through the hole of the anchor installation port 138, a tool such as a screwdriver or hex-driver may be used to push in and twist the threaded barrel 104 approximately ninety degrees.

The threaded barrel 104 is effectively spring loaded when the spring 122 (FIG. 1B) is compressed as the tool pushes the threaded barrel 104 inwards and towards the spring 122. As seen in FIG. 3C, the pressure of spring 122 substantially holds the threaded barrel 104 in position on the backside of the rail 230. The rail 230 includes a groove 236 configured on the backside of the middle portion 235. The groove 236 is aligned with the center of the anchor installation ports 138, perpendicular to the notches 140, and spans the length of the rail 230. Groove 236 is an example of groove 137 shown in FIG. 5. When the threaded barrel 104 is rotated approximately ninety degrees the wing portions 120 become aligned with and insert into the groove 236, and the spring 122 pressure prevents the threaded barrel 104 from rotating by biasing the wing portions 120 into the groove 236. In some embodiments, an audible "click" may occur when the threaded barrel 104 is rotated and the reconfigurable anchor assembly 102 is installed in the rail 230.

Figure 3D:
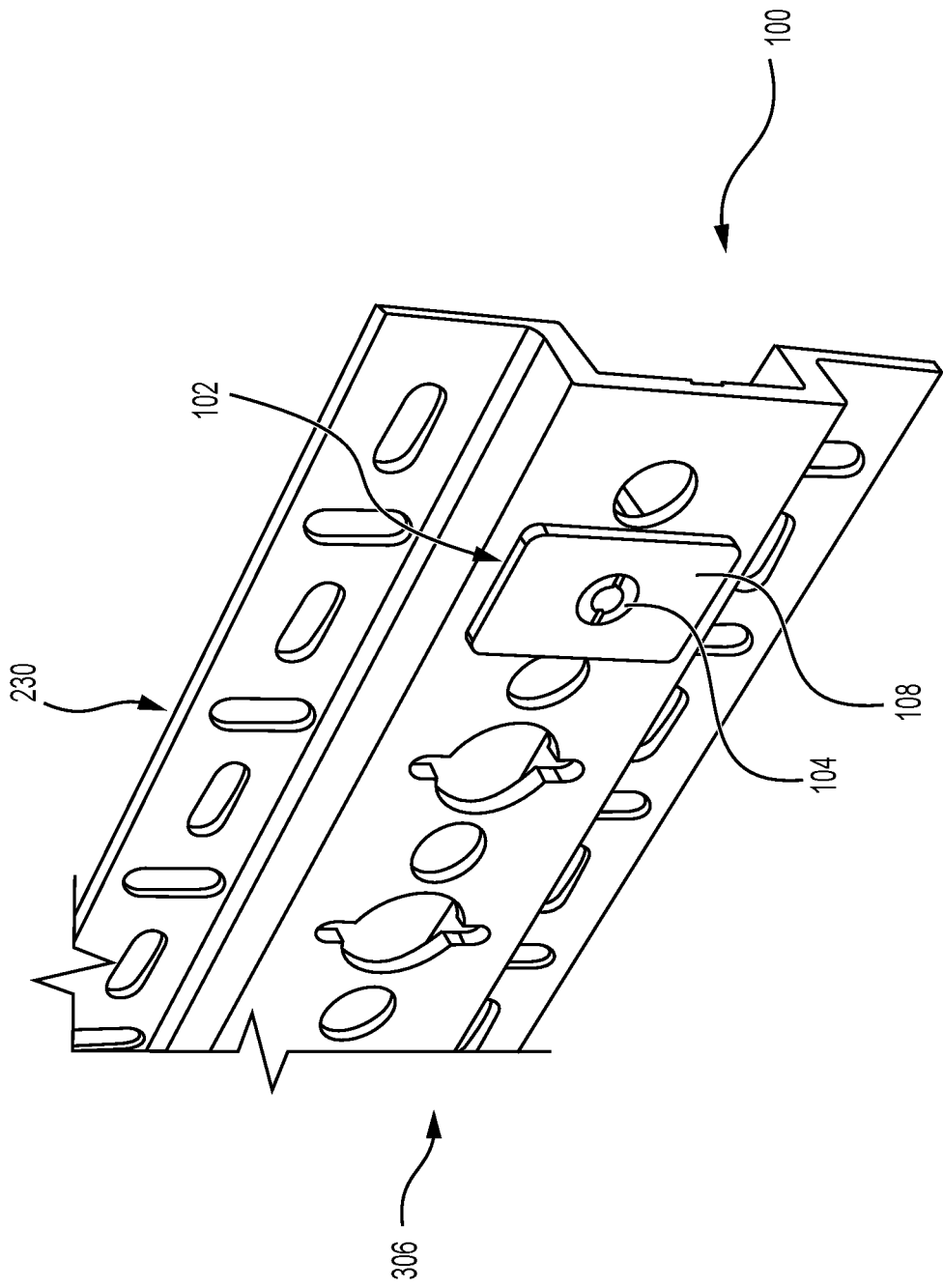
FIG. 3D is a front perspective view of an adaptive hardware system comprising the reconfigurable anchor assembly of FIG. 1A installed into the anchor installation port of the rail of FIG. 2B.

In a step 306, shown in FIG. 3D, the reconfigurable anchor assembly 102 is installed and is secure in the rail 230 such that the plate portion 108 is rotated ninety degrees with the threaded barrel 104.

Figure 4:
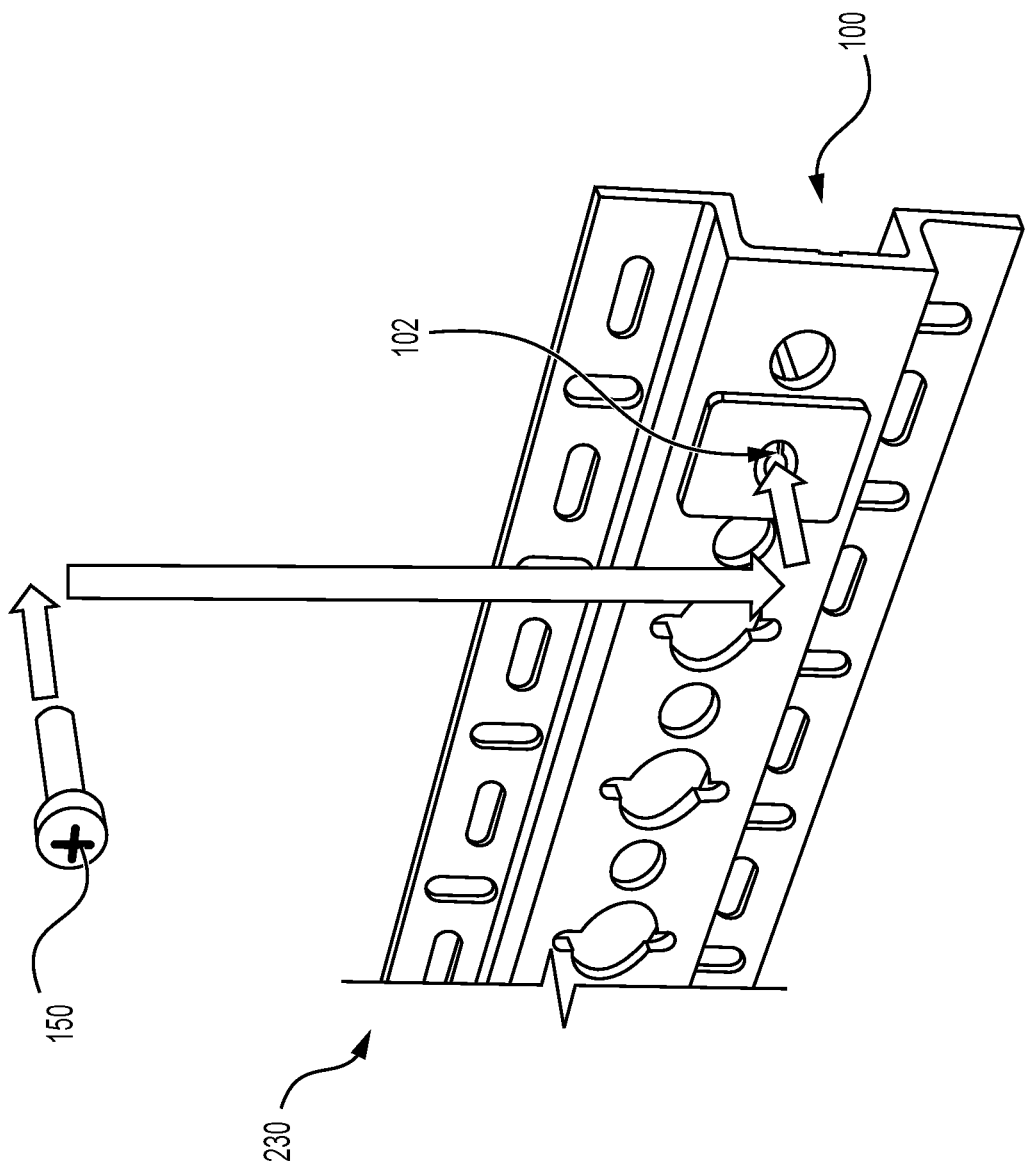
FIG. 4 is a perspective view of the adaptive hardware system of FIG. 3D configured to receive a fastener.

FIG. 4 shows a threaded fastener 150 for insertion into the threaded barrel 104 of the reconfigurable anchor assembly 102. The arrows shown in FIG. 4 depict an exemplary path for aligning the threaded fastener 150 with the threaded barrel 104. The threaded fastener 150 may comprise any threaded fastener, such as a bolt, with exterior threads configured for threading into the threaded barrel 104. The threaded fastener 150 may be used to install additional hardware or fixtures onto the rail 230. Additional hardware may include brackets, isolators, or other types of hardware such as monuments, for example.

Figure 5:
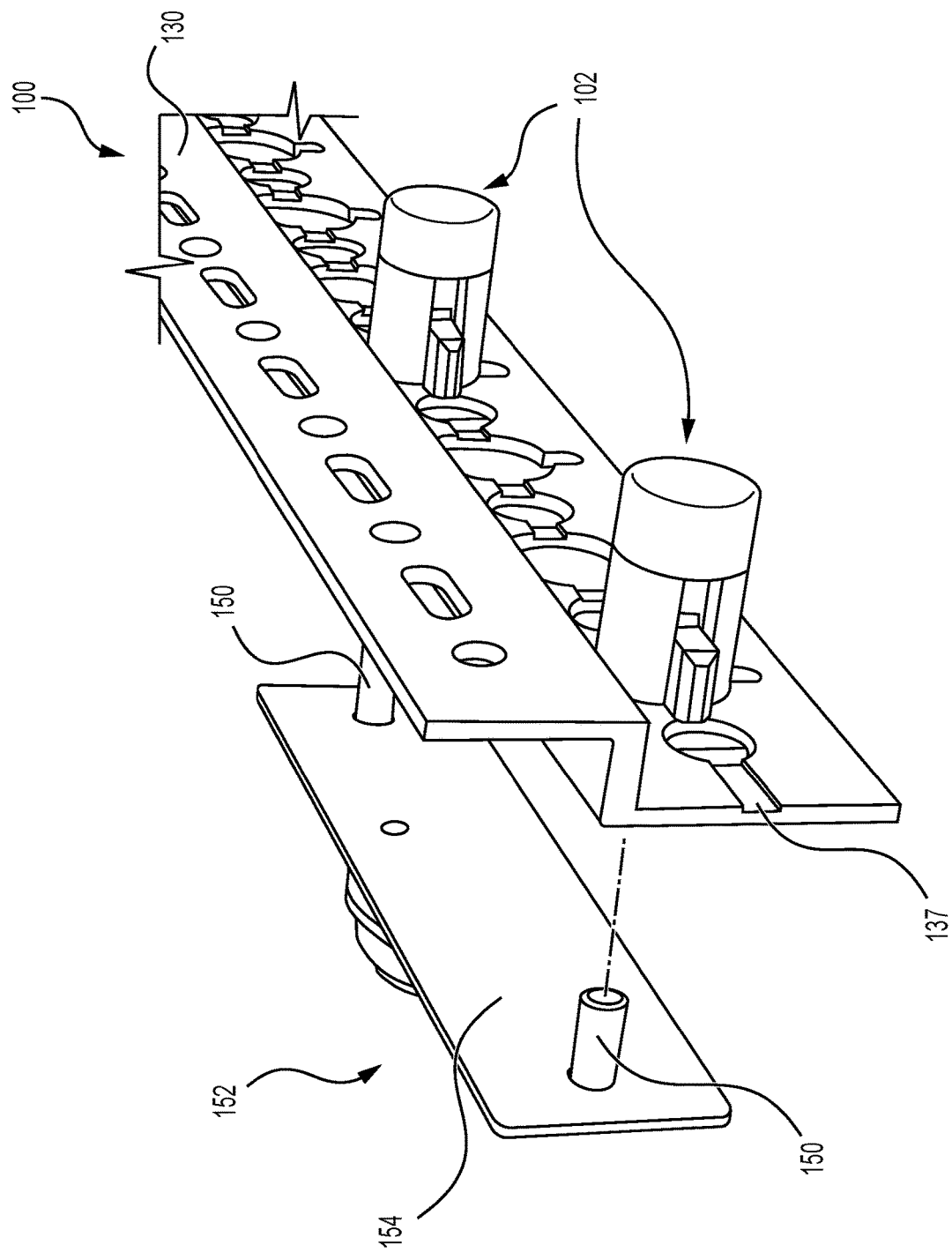
FIG. 5 is a rear perspective view of hardware being installed onto the adaptive hardware system of FIG. 3D.

As shown in FIG. 5, the threaded fastener 150 allows for hardware 152 to be installed onto the rail 230 when the threaded fastener 150 is inserted into the threaded barrel 104 of the reconfigurable anchor assembly 102. The hardware 152 may include multiple fasteners 150 inserted through a bracket 154, with each bolt inserting into a corresponding reconfigurable anchor assembly 102. In the embodiment shown in FIG. 5, a single bracket 154 is shown with fasteners 150 on opposing ends to insert into the threaded barrel 104 of respective reconfigurable anchor assemblies 102. In embodiments, two reconfigurable anchor assemblies 102 are aligned with the fasteners 150 by using appropriately spaced anchor installation ports 138. When the threaded fastener 150 is twisted into the threaded barrel 104, the force of the bolt pulls and biases the wing portions 120 into the groove 137 (i.e. similar to groove 236) of the rail 130 thereby securing the reconfigurable anchor assembly 102 and the hardware 152 to the rail 130.

Figure 6:
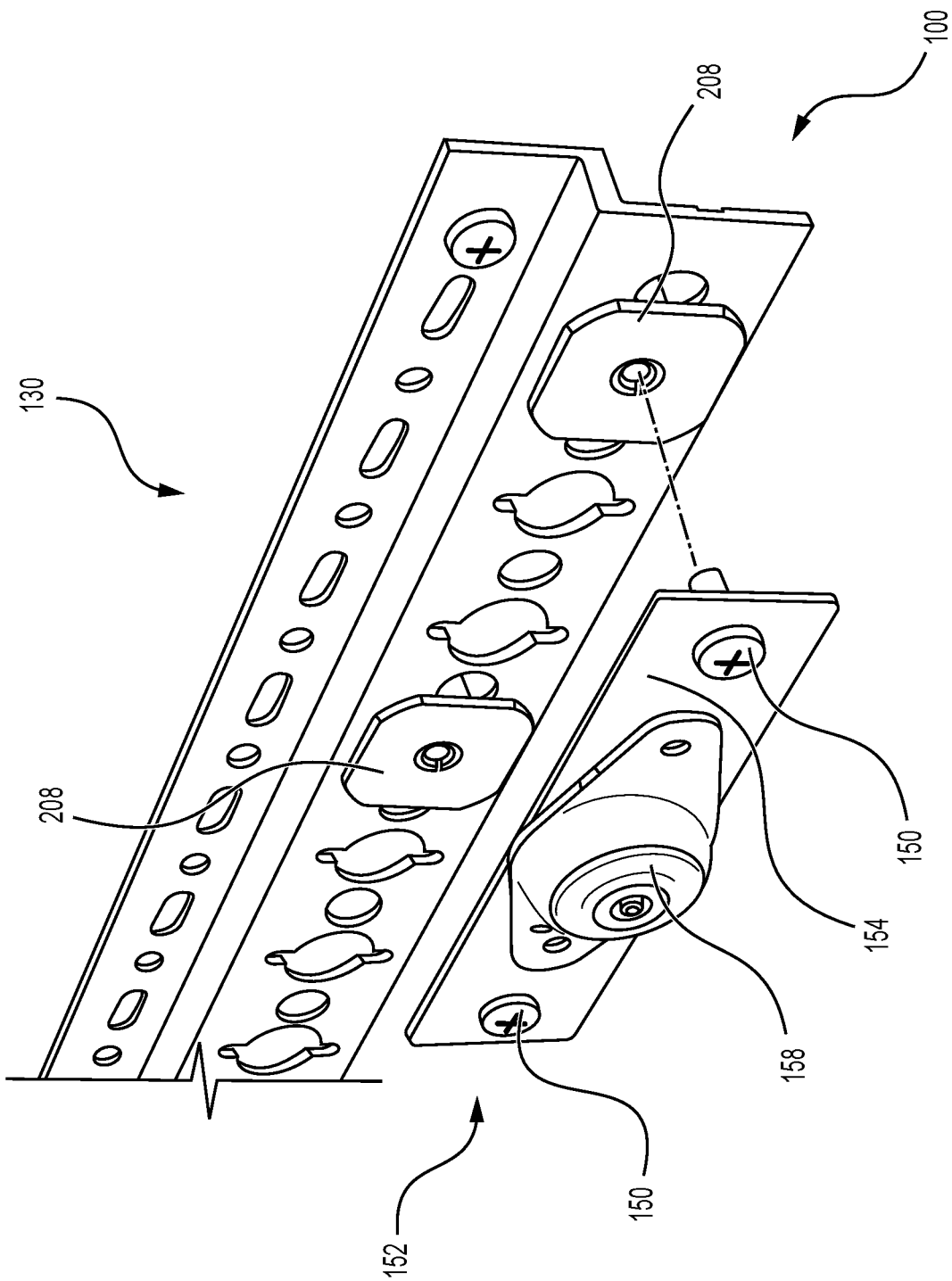
FIG. 6 is a front perspective view of hardware being installed onto the adaptive hardware system of FIG. 3D.

FIG. 6 shows a front perspective view of the hardware 152 being installed onto the rail 130 using the reconfigurable anchor assembly 102. In embodiments, an anchor plate 106 having a square plate portion 208 may be used, as depicted in FIG. 6 for example. The anchor plate 106 and plate portion 208 allow for the threaded barrel 104 to be recessed below the face of the plate portion 208 when the reconfigurable anchor assembly 102 is installed onto the rail 130. Hardware 152 may be installed onto the reconfigurable anchor assemblies 102 using threaded fasteners 150 which insert into the threaded barrel 104 such that the bracket 154 directly contacts the plate portion 208. In embodiments, the hardware 152 includes a monument 158 installed onto a side of the bracket 154 facing away from the rail 130 and in between the opposed fasteners 150. The monument 158 creates a mounting location where numerous different fixtures may be secured and installed. In embodiments, numerous different types of monuments 158 each having different shapes, sizes, and configurations may be installed onto any of the rails 130, 230, and 330.

Figure 7:
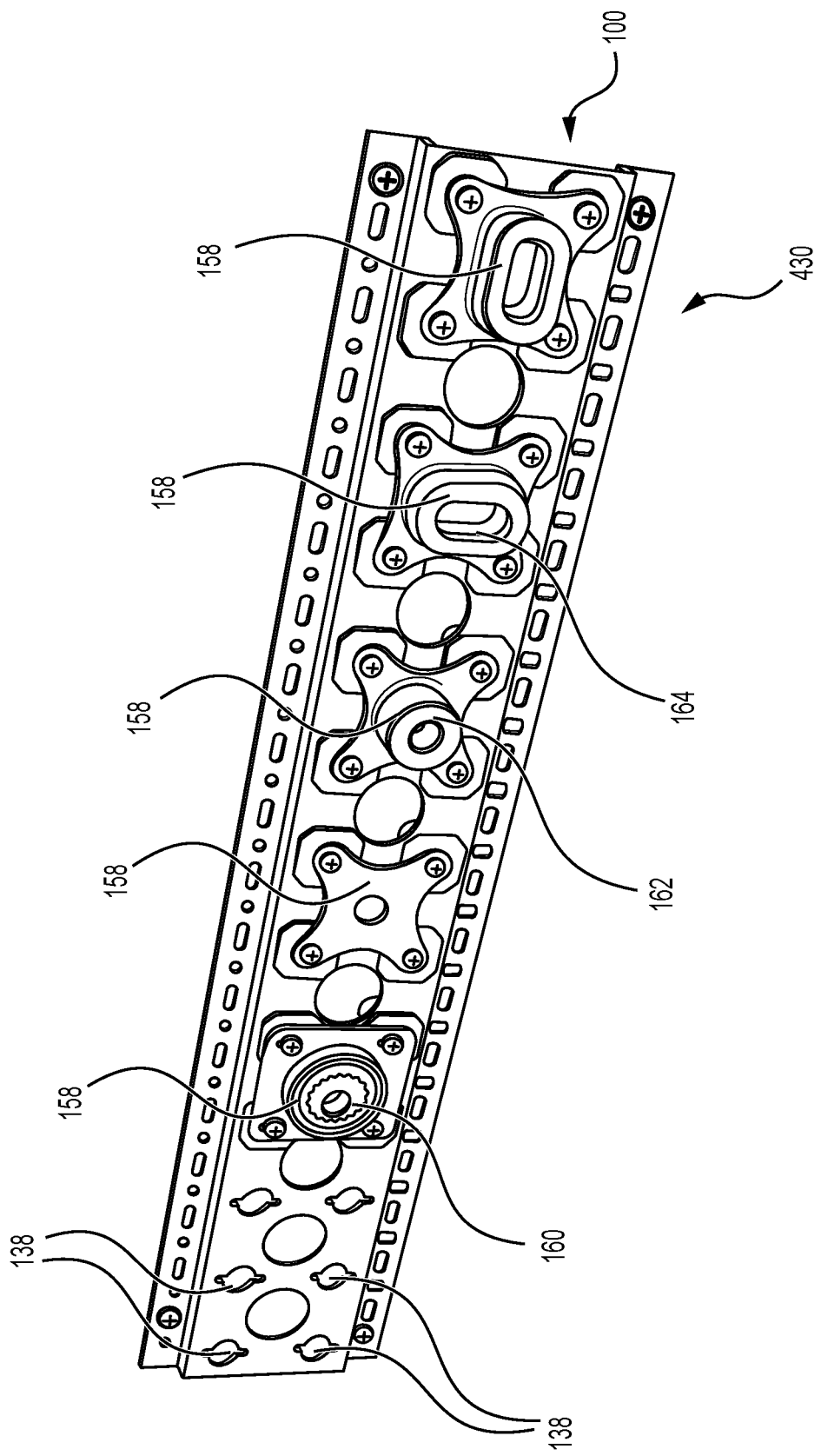
FIG. 7 is a perspective view of hardware being installed onto another rail using the adaptive hardware system of FIG. 3D.

FIG. 7 shows an alternative rail 430 where many reconfigurable anchor assemblies 102 are used to install numerous different types of hardware to the rail 430 via monuments 158, for example. In embodiments, the rail 430 includes anchor installation ports 138 aligned in two horizontal rows with aligned vertical columns spanning the length of the rail 430. In embodiments, monuments 158 are installed to the rail 430 using four reconfigurable anchor assemblies 102 each positioned at a corner of each monument 158. Each monument 158 includes a centered aperture which may allow each monument 158 to be configured with numerous different types of fixtures. For instance, in embodiments, an aperture 160 includes gear teeth and another aperture 162 is cylindrically protruded outwards with a circular center hole. Another aperture 164 includes a vertically aligned ovular aperture with outwardly protruding walls.

Each of the rails 130, 230, 330, and 430 include the anchor installation ports 138 disposed throughout the length of the rail allowing for the reconfigurable anchor assembly 102 to be installed anywhere along the length of the rail. Advantageously, this allows for monuments 158 to be adjustably placed along the length of the rail 130, 230, 330, and 430 such that monuments 158 may be reconfigured or moved allowing hardware which may be installed to each monument 158 the ability to be changed. For instance, a monument 158 is installed by installing one or many rails 130, 230, 330, or 430 to aircraft structure. Reconfigurable anchor assemblies 102 may be installed into the anchor installation ports 138 of any rail 130, 230, 330, or 430 using a tool such as a screwdriver. A threaded fastener 150 which may include hardware 152 and a bracket 154 may be inserted into the threaded barrel 104 such that a monument 158 configured on the bracket 154 may be secured to the rail 130, 230, 330, or 430. In this way, the location of a monument 158 is easily adjustable without altering aircraft structure by moving the reconfigurable anchor assembly 102 throughout the length of the mounted rail 130, 230. 330, or 430.

Figure 8:
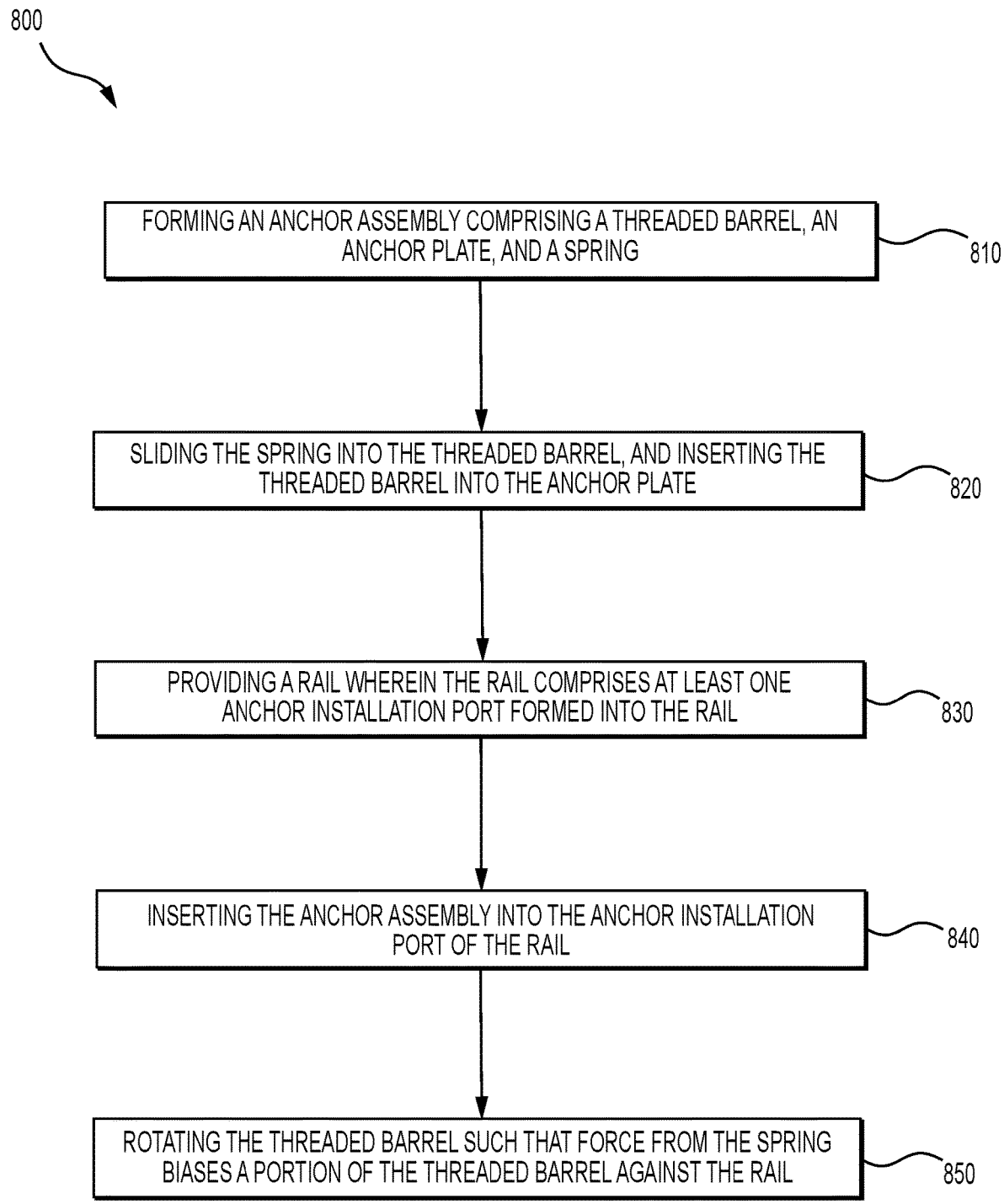
FIG. 8 is a diagram showing steps of an adaptive hardware installation method.

FIG. 8 shows an adaptive hardware installation method 800.

In a step 810, the reconfigurable anchor assembly 102 is formed. The anchor assembly 102 includes the threaded barrel 104, the anchor plate 106, and the spring 122 as shown in FIG. 1B.

In a step 820, the spring 122 is slid into the threaded barrel 104 of barrel insert 105, and the barrel insert 105 is inserted into the cylinder portion 110 of anchor plate 106.

In a step 830, a rail which may be rail 130, 230, 330, or 430 is provided. The rail is provided with at least one anchor installation port 138 being formed into a portion of the rail as shown in FIGS. 2A-2C.

In a step 840, reconfigurable anchor assembly 102 is inserted into the anchor installation port 138 formed into the rail 130, 230, 330, or 430, which may be seen in FIGS. 3A-3D.

In a step 850, threaded barrel 104 is rotated using a tool such that rotation allows the wing portions 120 to align and insert into groove 236 with force from spring 122 pushing threaded barrel 104 and wing portions 120 against the rail as shown in FIGS. 3B and 3C. In an example of step 850, threaded barrel 104 is rotated with a screwdriver or hex-driver.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An adaptive hardware system, the system comprising:
a rail having a length wherein the rail includes at least one anchor installation port; and
an anchor assembly configured to slide into the at least one anchor installation port for securing to the rail, wherein the anchor assembly comprises:
a threaded barrel configured to receive a fastening element;
a spring disposed within the anchor assembly to bias the threaded barrel against the rail;
an anchor plate having a plate portion and a cylinder portion extending from the plate portion, wherein the cylinder portion comprises a first section and a second section, and wherein the second section has a narrower diameter than the first section; and
an end cap, wherein the end cap is configured to slide over the second section of the cylinder portion for holding the anchor assembly together.

2. The adaptive hardware system of claim 1, wherein the rail comprises a groove aligned with the length of the rail and centered with the at least one anchor installation port.

3. The adaptive hardware system of claim 2, wherein the threaded barrel comprises opposed wing portions extending from opposing sides of the threaded barrel.

4. The adaptive hardware system of claim 3, wherein the spring biases the opposed wing portions into the groove aligned with the length of the rail.

5. The adaptive hardware system of claim 3, wherein the cylinder portion comprises slots through opposing sides, wherein the slots are configured to receive the opposed wing portions of the threaded barrel when the threaded barrel is inserted into the cylinder portion of the anchor plate.

6. The adaptive hardware system of claim 3, wherein the anchor assembly is configured to be secured to the rail by rotating the threaded barrel such that the opposed wing portions are aligned with the groove.

7. The adaptive hardware system of claim 1, wherein the rail comprises at least one mounting provision comprising a slot configured to receive another fastening element.

8. An adaptive hardware system, the adaptive hardware system comprising:
a rail wherein the rail includes at least one anchor installation port;
an anchor assembly configured to slide into the at least one anchor installation port for securing to the rail, wherein the anchor assembly comprises:
an anchor plate comprising a plate portion and a cylinder portion extending from the plate portion, wherein the cylinder portion comprises a first section and a second section, and wherein the second section has a narrower diameter than the first section;
a threaded barrel configured to receive a fastening element and to slide into the anchor plate;
a spring configured to slide into the anchor plate and bias the threaded barrel against the plate portion; and
an end cap configured to slide over the second section of the cylinder portion of the anchor plate for holding the anchor assembly together.

9. The adaptive hardware system of claim 8, wherein the at least one anchor installation port comprises a circular hole with opposed notches.

10. The adaptive hardware system of claim 9, wherein the threaded barrel comprises wing portions formed on opposing sides of the threaded barrel and aligned with the opposed notches when the anchor assembly inserts into the at least one anchor installation port.

11. The adaptive hardware system of claim 8, wherein the fastening element is a threaded fastener, and the threaded fastener is mechanically coupled to a bracket.

12. The adaptive hardware system of claim 11 comprising a monument mechanically coupled to the bracket wherein the monument is configured to accept a fixture.

13. The adaptive hardware system of claim 8, wherein the at least one anchor installation port comprises a plurality of anchor installation ports each configured to receive a respective one of a plurality of anchor assemblies.

14. An adaptive hardware installation method, the method comprising:
forming an anchor assembly wherein the anchor assembly comprises;
a threaded barrel configured to receive a fastening element;
an anchor plate having a plate portion and a cylinder portion extending from the plate portion, wherein the cylinder portion comprises a first section and a second section, and wherein the second section has a narrower diameter than the first section;
a spring; and
an end cap, wherein the end cap is configured to slide over the second section of the cylinder portion for holding the anchor assembly together;
sliding the spring into the threaded barrel;
inserting the threaded barrel into the anchor plate;
providing a rail wherein the rail comprises at least one anchor installation port formed into the rail;
inserting the anchor assembly into the at least one anchor installation port of the rail; and
rotating the threaded barrel such that force from the spring biases a portion of the threaded barrel against the rail.

15. The method of claim 14, wherein the threaded barrel comprises wing portions and the least one anchor installation port comprises opposed notches, such that rotating the threaded barrel occurs after insertion into the at least one anchor installation port for aligning the wing portions perpendicular to the opposed notches.

16. The method of claim 15 comprising pulling the wing portions into a groove on a back side of the rail following the step of rotating the threaded barrel such that the anchor assembly and a bracket are secured to the rail.

* * * * *